(12) United States Patent
Pozhenko et al.

(10) Patent No.: US 8,593,977 B2
(45) Date of Patent: Nov. 26, 2013

(54) METHOD AND APPARATUS FOR TRANSMITTING DATA AND METHOD AND APPARATUS FOR PERFORMING DATA TASKS

(75) Inventors: Mikhail Pozhenko, Suwon-si (KR); Sang-bum Suh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 101 days.

(21) Appl. No.: 12/201,145

(22) Filed: Aug. 29, 2008

(65) Prior Publication Data

US 2009/0190607 A1 Jul. 30, 2009

(30) Foreign Application Priority Data

Jan. 29, 2008 (KR) .................. 10-2008-0009006

(51) Int. Cl.
*H04L 12/26* (2006.01)

(52) U.S. Cl.
USPC .............. 370/252; 370/395.21; 709/205

(58) Field of Classification Search
USPC ................. 709/205; 370/252, 295.21
See application file for complete search history.

(56) References Cited

U.S. PATENT DOCUMENTS

| | | | |
|---|---|---|---|
| 5,832,522 A * | 11/1998 | Blickenstaff et al. | 1/1 |
| 6,606,413 B1 * | 8/2003 | Zeineh | 382/232 |
| 6,909,697 B1 * | 6/2005 | Langley | 370/252 |
| 2004/0071096 A1 * | 4/2004 | Na et al. | 370/252 |
| 2007/0081513 A1 * | 4/2007 | Torsner | 370/349 |
| 2008/0003951 A1 * | 1/2008 | Kuwahara et al. | 455/73 |

* cited by examiner

*Primary Examiner* — Kibrom T Hailu
*Assistant Examiner* — Zewdu A Beyen
(74) *Attorney, Agent, or Firm* — Sughrue Mion, PLLC

(57) ABSTRACT

A method and apparatus for transmitting data and a method and apparatus for performing a task for process migration are provided. The method of transmitting data includes: determining a data transmission priority using at least one of information relating to data needed to continuously perform a task, that is currently performing, in an external device and information relating to data transmission means; determining transmission methods for each data based on the data transmission priority; and transmitting data to the external device according to the determined transmission methods.

13 Claims, 6 Drawing Sheets

METHOD AND APPARATUS FOR TRANSMITTING DATA AND METHOD AND APPARATUS FOR PERFORMING DATA TASKS

CROSS-REFERENCE TO RELATED PATENT APPLICATION

This application claims the benefit of Korean Patent Application No. 10-2008-0009006, filed on Jan. 29, 2008, in the Korean Intellectual Property Office, the disclosure of which is incorporated herein in its entirety by reference.

BACKGROUND OF THE INVENTION

1. Field of the Invention

The present invention relates to a method and apparatus for transmitting data and a method and apparatus for performing a task, and more particularly, to a method and apparatus for transmitting data for process migration and a method and apparatus for performing a migrated process.

2. Description of the Related Art

Data processing speed in computers (or processors) has gradually increased; however, further improvements in this regard are limited. Accordingly, a distribution system has been introduced as an alternative to further increase data processing speed. A plurality of computers interconnected through a network form a distribution system. Since data processing is executed by the plurality of computers in the distribution system, data processing speed is increased considerably.

Process migration is one technique used in the distribution system in order to transmit a process performed in a source device to a target device. When the process migration technique is used, a part of a task to be performed by an over-loaded computer is performed by a less-loaded computer so that dynamic load balancing can be efficiently accomplished in the computers of the distribution system.

However, in the conventional art, when two or more processes are to migrate to a target device, the process migration order has not yet been determined so that a process to be performed firstly is sometimes performed later. Moreover, when only one process is to migrate, which data from among data needed to migrate the process should be firstly transmitted has not been yet determined so that a target device can perform the process only after all data is transmitted.

Meanwhile, according to the latest developments in information and communication technologies, the number of users who use more than two spatially separated computers has increased. An example will be given when one computer is used at work and another computer is used at home and a user moves to a different place while he/she performs a process using a computer at work. When performing another task using the processes performed or results obtained by performing the process is not urgent, problems may not occur. In this case, the user may move to a different place while the computer is turned on so as to perform the process automatically or the user may move to a different place after the performing of the task is temporarily stopped. However, when performing another task using the processes performed or the results obtained by performing the process is urgent, the above described case may not be applied. In this case, when the process currently performing is moved to the computer at home using a process migration technique, the process can be continuously performed using the computer at home.

As such, a process migration technique can be applied not only to a distribution system but also to spatially separated computers.

However, when the conventional process migration technique is applied to the distribution system, a network connection between the source device and the target device should be stable, otherwise the process migration cannot be performed.

Thus, as an alternative, a method of storing data needed for process migration from the source device in a mobile storage medium and transmitting the stored data to the target device has been proposed. However, when the storage capacity of the mobile storage medium is not sufficient, data to be written has not yet been determined so that data cannot be transmitted or data must be sequentially written, regardless of the importance. Moreover, even in an urgent case, for example, when a user cannot wait for the data to be transmitted, all data should be written and thus a data transmission time increases.

SUMMARY OF THE INVENTION

The present invention provides a method and apparatus for efficiently transmitting data for process migration and a method and apparatus for efficiently performing a task using the transmitted data.

According to an aspect of the present invention, there is provided a method of transmitting data, including: determining a data transmission priority using at least one of information relating to data needed to continuously perform a task, that is currently performing, in an external device and information relating to data transmission means; determining transmission methods for each data based on the data transmission priority; and transmitting data to the external device according to the determined transmission methods.

The transmitting data may include transmitting data having the data transmission priority that is above a threshold order through a first transmission means and data having the data transmission priority that is below the threshold order through a second transmission means.

The determining transmission methods may include compressing data having the data transmission priority that is below a threshold order and wherein the transmitting data comprises transmitting uncompressed data having the data transmission priority that is above the threshold order data and the compressed data.

The transmitting data may include: transmitting data having the data transmission priority that is above a threshold order; and transmitting data having the data transmission priority that is below the threshold order when a transmission request signal is received from the outside.

The method may further include setting a standard for determining the data transmission priority based on an input from the outside, and wherein the determining of the data transmission priority further uses the set standard for determining the data transmission priority.

The method may further include receiving input selecting one transmission mode from among transmission modes in which data transmission methods according to the data transmission priority are prescribed, and wherein the determining transmission methods is performed based on the selected transmission mode.

The information relating to data transmission means may include at least one of a size of a usable storage space and a data transmission speed and the information relating to data needed to continuously perform a task comprises information relating to at least one of a task execution state, a communication state, an address allocation, and a task control.

According to another aspect of the present invention, there is provided method of performing a task, including: receiving first data having data transmission priority that is above a threshold order according to a predetermined standard from among data needed to continuously perform a task, that is currently performing, in an external device through a first transmission method and receiving second data having data transmission priority that is below the threshold order through a second transmission method; and continuously performing the task in the external device using the first and second data.

The receiving may include receiving the first data through a mobile storage medium which can be removed from and attached to the external device and receiving the second data through a network.

The data may include information relating to at least one of a task execution state, a communication state, an address allocation, and a task control.

According to another aspect of the present invention, there is provided an apparatus for transmitting data, including: a priority determining unit which determines a data transmission priority using at least one of information relating to data needed to continuously perform a task, that is currently performing, in an external device and information relating to data transmission means; a transmission method determining unit which determines transmission methods for each data based on the data transmission priority; and a transmission unit which transmits data to the external device according to the determined transmission methods.

According to another aspect of the present invention, there is provided an apparatus for performing a task, including: a receiver which receives first data having data transmission priority that is above a threshold order according to a predetermined standard from among data needed to continuously perform a task, that is currently performing, in an external device through a first transmission method and receiving second data having data transmission priority that is below a threshold order through a second transmission method; and a task performing unit which continuously performs the task in the external device using the first and second data.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which exemplary embodiments of the invention are shown.

Figure 1:
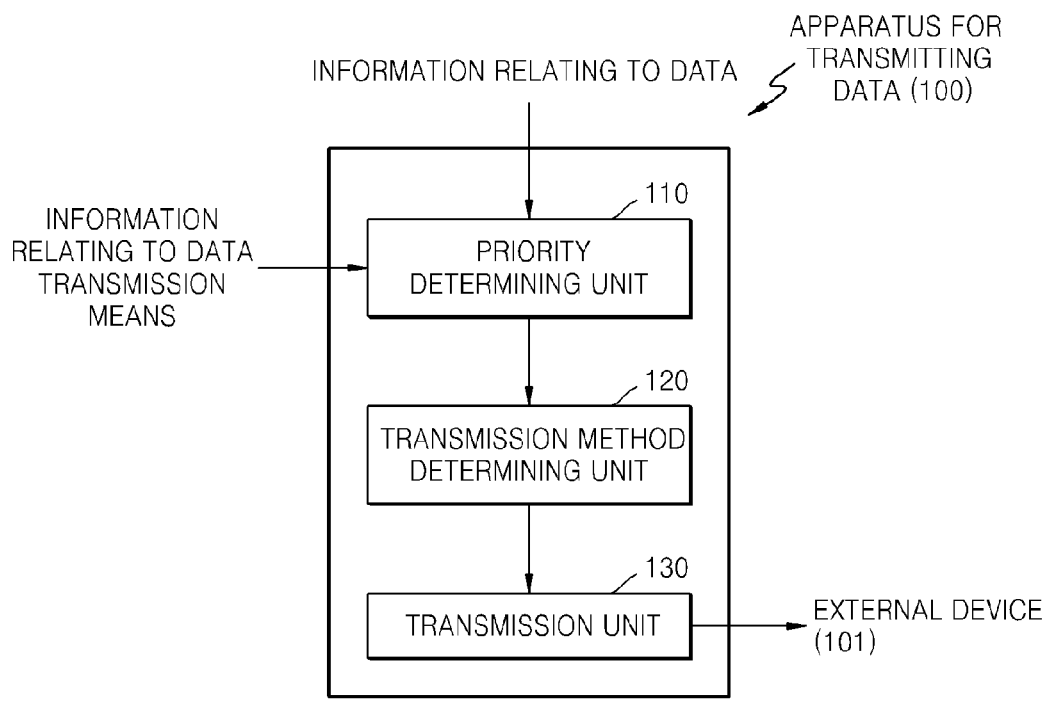
FIG. 1 is a block diagram of an apparatus for transmitting data according to an embodiment of the present invention.

FIG. 1 is a block diagram of an apparatus for transmitting data 100 according to an embodiment of the present invention.

The apparatus for transmitting data 100 includes a priority determining unit 110, a transmission method determining unit 120, and a transmission unit 130.

The priority determining unit 110 receives information relating to data needed to continuously perform a task, that is currently performing in the apparatus for transmitting data 100, in an external device 101. In order for the task currently processed in one device to be continuously performed in another device, various kinds of information capable of indicating data processing modules and a current status of the task should be transmitted. The priority determining unit 110 may further receive information relating to data transmission means, the information relating to the data transmission means including a transmission environment parameter such as a size of a usable storage space or a transmission speed. The priority determining unit 110 determines the priority of data based on information relating to data to be transmitted and information relating to the transmission means.

The priority determining unit 110 may further include a standard setting unit (not shown) to set a standard for determining the priority for determining the transmission priority for data. The standard setting unit (not shown) may set the most reasonable standard for determining the priority using information relating to data to be transmitted and information relating to the transmission means, instead of receiving an input from a user. As an example, types, importance, preference, and size of data to be transmitted may be used as the standard for determining the priority.

However, the standard setting unit (not shown) may set the standard for determining the priority based on an input from the outside. When a user desires to firstly receive data needed for video processing, whether the data is needed for video processing may be the standard for determining the priority. Similarly, when a user desires to rapidly receive data, the capacity of data may be the standard for determining the priority. Each of the standards for determining the priority may have the same importance. However, greater importance may be given to a specific standard for determining the priority.

The transmission method determining unit 120 determines the transmission methods for each data based on the priority. Data is classified into two or more groups according to a transmission environment and the transmission methods that are different from each other are applied to each group. As an example, data having a high priority is transmitted through a mobile storage medium and data having a low priority may have different transmission means such as when data is transmitted through a network. In addition, according to when data having a high priority is not compressed and only data having a low priority is compressed, a format of data may be different. Also, according to when data having a high priority is firstly transmitted and data having a low priority is transmitted after a request by a user is received, a transmission time may be different.

The transmission method determining unit 120 may determine the transmission methods for each data based on not only the priority but also a transmission mode selected by a user. The apparatus for transmitting data 100 previously sets the transmission mode which prescribes data transmission method and allows the selection by a user. This will be described in more detail with reference to FIG. 4.

The transmission unit 130 transmits data to an external device according to the determined transmission method. The transmission unit 130 may transmit all data via one transmission means or via two or more transmission means.

In the present invention, a task may be performed by one process or by combining a plurality of processes. When the task is performed by one process, the priority of data needed to migrate the corresponding process is determined and then data is transmitted through different transmission methods according to the priority.

Meanwhile, when the task is performed by combining a plurality of processes, the priority of the processes may be firstly determined and then the priority of data needed to migrate each process may be determined. Also, only the priority of data needed to migrate each process may be determined without determining the priority of the processes. In the former case, the priority of data by each process is determined. In the latter case, the priority of data is determined regardless of the priority of the processes.

Figure 2:
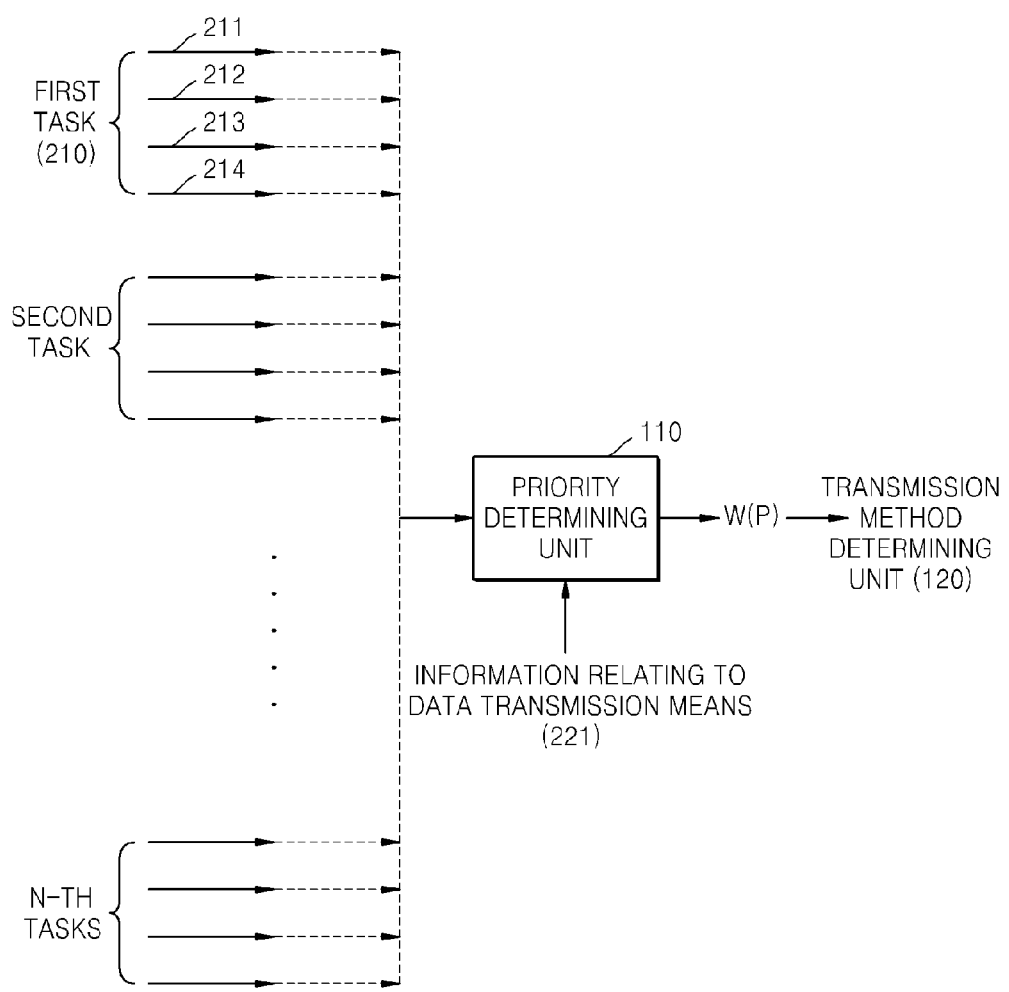
FIG. 2 is a detailed diagram of a priority determining unit of FIG. 1.

FIG. 2 is a detailed diagram of the priority determining unit 110 of FIG. 1.

Currently, N tasks are performed in a first device (not shown) and a first task 210 is to be continuously performed in a second device (not shown).

The priority determining unit 110 receives information 211, 212, 213, and 214 relating to data needed for the first task 210 to be continuously performed in the second device. The first task 210 is only one process and the information 211, 212, 213, and 214 relating to data to be transmitted is data needed to migrate the process. For the process migration, information indicating a progress status of the first task 210 should be transmitted with data process modules forming the process. As an example, information relating to the execution state of the first task, information relating to a communication state, information relating to address allocation, and information relating to task control should be transmitted.

The priority determining unit 110 receives information 221 relating to data transmission means. The data transmission means may include a mobile storage medium which can be attached to or removed from the first device (not shown), a wire network, and a wireless network. The information 221 relating to the transmission means includes information relating to a transmission environment such as a data transmission speed from a usable storage space of the mobile storage medium or in a network.

The priority determining unit 110 determines the priority of data 211, 212, 213, and 214 based on the information relating to data 211, 212, 213, and 214 to be transmitted and information 221 relating to data transmission means. The priority determining unit 110 determines whether data conforms to a predetermined standard and assigns weights to each data according to the determination result, thereby determining the data priority. Determining the data priority according to the weight assigned by the priority determining unit 110 is described later with reference to FIG. 3.

When the priority of data is determined according to the assigned weight, the priority determining unit 110 outputs weight values assigned to each data or outputs a function indicating the weight. W(p) denotes the function indicating the weight assigned to each data. W(p) is transmitted to the transmission method determining unit 120 along with data to be transmitted to the second device (not shown).

Figure 3:
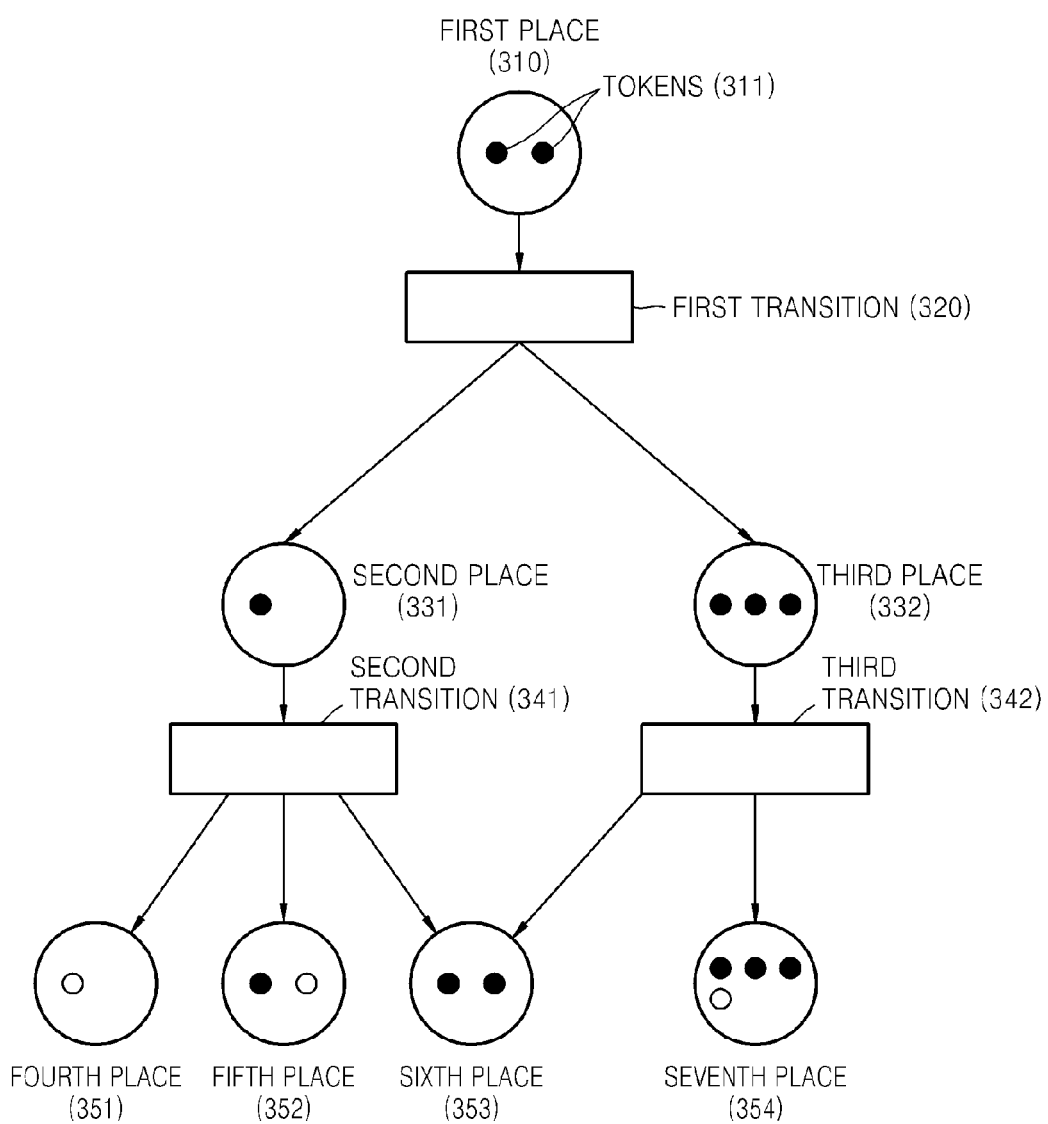
FIG. 3 is an example of determining data priority according to an embodiment of the present invention.

FIG. 3 is an example of determining the data priority according to an embodiment of the present invention.

In FIG. 3, determining the data priority is described in the case of a Petri net.

The current task is performed in the first device (not shown) and the priority of data to be determined is video data.

In the Petri net, nodes indicated by circles are referred to as places and each place represents a current status. In addition, nodes indicated by rectangles are referred to as transitions and each transition includes a conditional expression. The transition determines the location of a next place according to whether the data satisfies the conditional expression. The place includes small circles called tokens. The more the number of tokens, the higher the data priority. When different places have the same number of tokens, filled-in tokens have priority over non filled-in tokens.

The first place 310 has two tokens 311. A first transition 320 determines whether a network connected to the first device (not shown) is activated. When the first device (not shown) is connected through a network and the network is activated, a pointer, which represents a current location, moves to a third place 332. On the other hand, when a network is not connected or activated, the pointer moves to a second place 331. When a network is activated, high-capacity data can be rapidly transmitted so that the data priority rises.

When the pointer moves to the second place 331, the pointer passes through a second transition 341. The second transition 341 compares usable capacity of the mobile storage medium connected to the first device (not shown) with the size of video data. When the size of video data is less than 10% of the usable capacity of the mobile storage medium, the pointer moves to a sixth place 353. When the size of video data is above 10% and less than 30% of the usable capacity of the mobile storage medium, the pointer moves to a fifth place 352. When the size of video data is above 30% of the usable capacity of the mobile storage medium, the pointer moves to a fourth place 351.

When the pointer moves to the third place 332, the pointer passes through a third transition 342. When the time taken for transmitting video data is more than 10 seconds, the pointer moves to the sixth place 353 and when the time taken for transmitting video data is below 10 seconds, the pointer moves to a seventh place 354.

According to the above-described method, when the pointer reaches the fourth place 351 through seventh place 354, no transition node exists anymore so that determining the data priority is completed. The more tokens exist in the place finally reached by pointer, the higher the data priority. When the filled-in tokens have scores of 1 and the non filled-in tokens have scores of 0.5, weights of 0.5, 1.5, 2, and 3.5 are respectively given to the fourth place 351 through the seventh place 354.

In FIG. 3, the number of the final places is four so that transmitted data is assigned the weight of one place from among the four places. According to an exemplary embodiment, more conditions are given so that data may have various weight values.

According to FIG. 3, the data priority is determined using information relating to video data and the transmission means only, without an input from a user. However, the standard for determining the data priority may be input from the user. As an example, when the user desires to firstly receive audio data without video file, the transition nodes may be further included to determine whether the current data is video data or audio data. In addition, in the case of video data, pointer moves to the place where the tokens do not exist or a small number of the tokens exists so that the transmission priority may be lowered.

Figure 4:
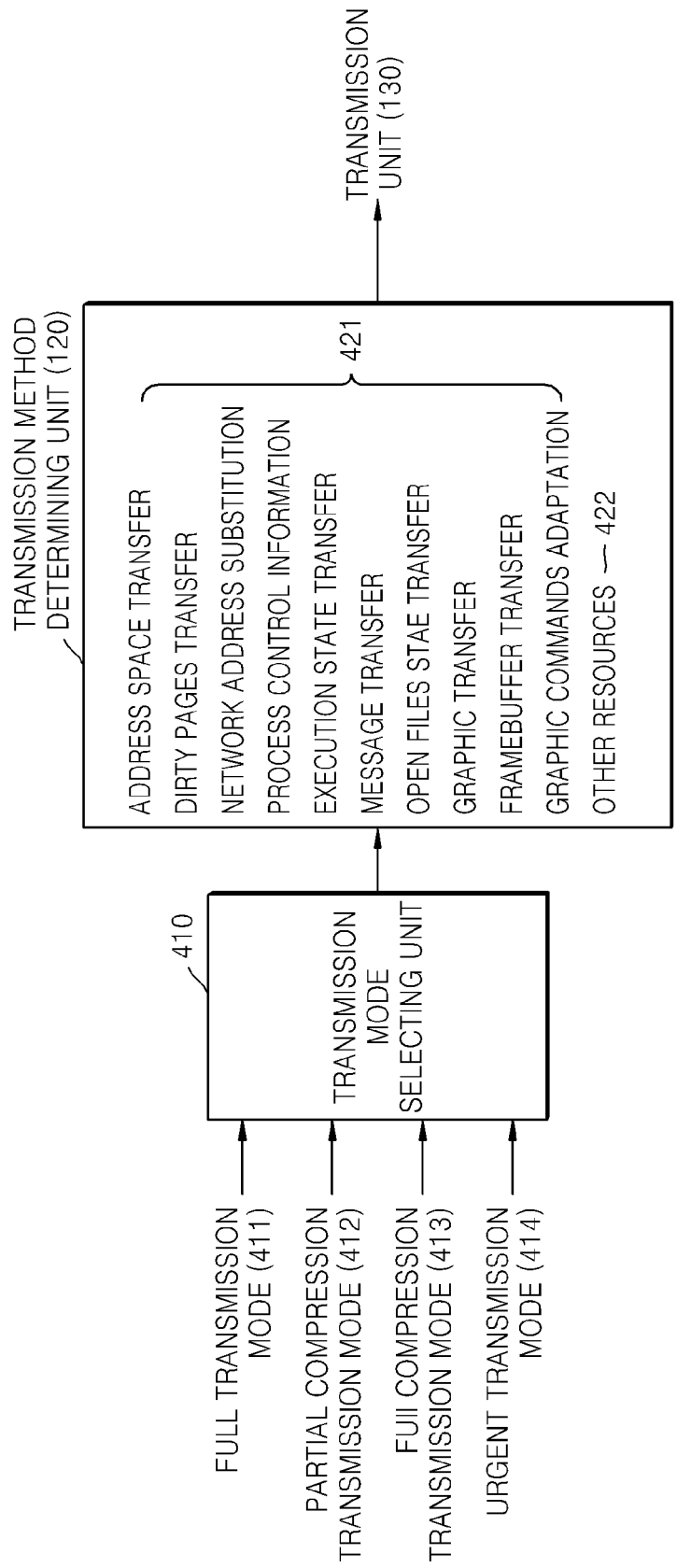
FIG. 4 illustrates operation of a transmission method determining unit according to an embodiment of the present invention.

FIG. 4 illustrates operation of the transmission method determining unit 120 according to an embodiment of the present invention.

A transmission mode selecting unit 410 receives a user input selecting one transmission mode from among the transmission modes which prescribe the data transmission methods according to the data priority. Hereinafter, it is assumed that four transmission modes are previously determined. A full transmission mode 411 is to transmit all data needed to continuously perform a task, without compressing data. The full transmission mode 411 is characterized by a sufficient storage space and is adequate for the case when an interface with fast data transmission speed is used. When the user selects the full transmission mode 411, the transmission method determining unit 120 allows all data to be transmitted without compressing data.

However, in this case, the transmission method determining unit 120 allows data to be transmitted through other transmission means according to the data priority. As an example, in the case of data which needs security, the data priority is higher so that the data is transmitted through the mobile storage medium, and in the case of data which does not need security, the data priority is lower so that the data is transmitted through a network.

In a partial compression transmission mode 412, data that is essential to continuously perform a task is transmitted, without compressing the data, and additional data is transmitted after compressing the additional data. When the user selects the partial compression transmission mode 412, the transmission method determining unit 120 compresses data having the data priority below a threshold order. The transmission method determining unit 120 includes a data compression unit (not shown) which compresses data having the data priority that is below a threshold order. The transmission unit 130 transmits compressed data having data priority that is below a threshold order and uncompressed data having data priority that is above a threshold order. Here, compressed data and uncompressed data may be transmitted together through one transmission means or through another transmission means.

Data illustrated in the transmission method determining unit 120 of FIG. 4 is transmitted when the user selects the partial compression transmission mode 412. When the user selects the partial compression transmission mode 412, data 421 that is essential to continuously perform a task is transmitted without compression and additional data 422 is transmitted in a compressed form.

In a full compression transmission mode 413, all data is compressed and transmitted. When the user selects the full compression transmission mode 413, the data compression unit (not shown) compresses all data. The data compression unit (not shown) separately compresses data having data priority above a threshold order and data having data priority below a threshold order and may transmit data through each different transmission means.

In an urgent transmission mode 414, data that is essential to continuously perform a task is firstly transmitted through the mobile storage medium and remaining data is stored in an external server that can be accessed by a target device, or remaining data is transmitted when a transmission request signal is received from the user.

When the user selects the urgent transmission mode 414, the transmission method determining unit 120 allows data having data priority above a threshold order to be transmitted through the mobile storage medium. Meanwhile, data having data priority below a threshold order is transmitted to an external server through a network or the same data is transmitted when a transmission request is received from the user.

As described above, for the user's convenience, the transmission method determining unit 120 changes the transmission means through which data is transmitted, the transmission time, and the format of data to be transmitted based on a transmission mode selection signal and the data priority. In particular, when the user has no time, only essential data is transmitted to the mobile storage medium, and the time taken for transmitting data can be controlled. The above described transmission modes are only an example and various transmission modes can be set according to operating conditions.

Figure 5:
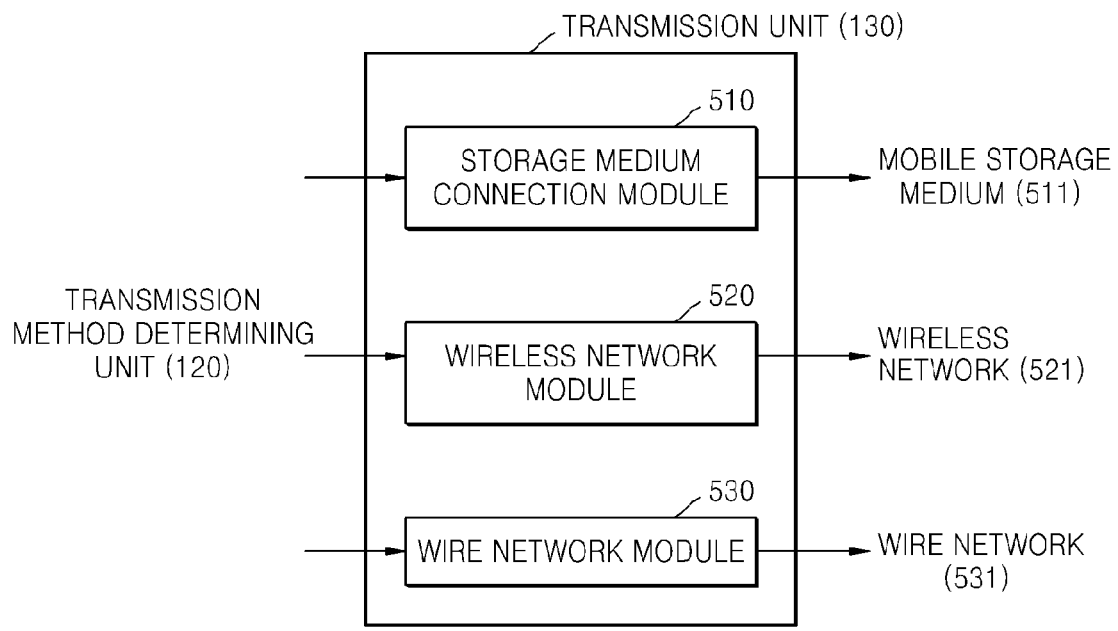
FIG. 5 illustrates operation of a transmission unit according to an embodiment of the present invention.

FIG. 5 illustrates operation of the transmission unit 130 according to an embodiment of the present invention.

The transmission unit 130 transmits data through at least one of a mobile storage medium 511, a wireless network 521, and a wire network 531 based on the determination of the transmission method determining unit 120. The transmission unit 130 may access the mobile storage medium 511, the wireless network 521, and the wire network 531 respectively through a storage medium connection module 510, a wireless network module 520, and a wire network module 530.

The transmission unit 130 may further include an error detection unit (not shown). The error detection unit generates a transmission error signal when an error is generated during data transmission so that the mobile storage medium 511 is disconnected, or the wire or wireless network 521 or 531 is disconnected. When the transmission error signal is generated, the transmission unit 130 may inform the user of the error or re-transmit data.

Figure 6:
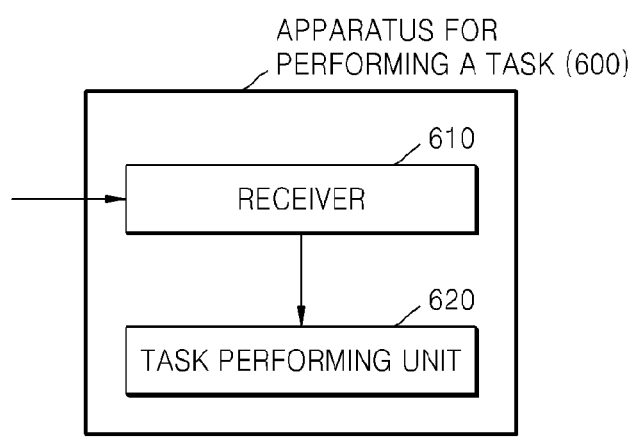
FIG. 6 is a block diagram of an apparatus for performing a task according to an embodiment of the present invention.

FIG. 6 is a block diagram of an apparatus for performing a task 600 according to an embodiment of the present invention.

The apparatus for performing a task 600 includes a receiver 610 and a task performing unit 620. The apparatus for performing a task 600 continuously performs a task that is currently performed in an external device (not shown) and the task may be one process.

The receiver 610 receives first data having data priority above a threshold order according to a predetermined standard from among data needed to continuously perform a task that is currently performed in the external device (not shown) through a first transmission method. Also, the receiver 610 receives second data having data priority below a threshold order through a second transmission method. The data priority is determined in the external device (not shown) according to a predetermined standard, in order to determine the transmission method.

Hereinafter, receiving data by the receiver 610 using two or more transmission methods is described.

The first and second transmission methods may be classified according to a transmission means. For example, the first data may be received through the mobile storage medium which can be removed from and attached to the external device and the second data may be received through a network.

In addition, the first and second transmission methods may be classified according to the format of data. For example, the first data may be received in a compressed form and the second data may be received in an uncompressed form. In this case, the task performing unit 620 which will be described later uncompresses the second data using an uncompressing unit (not shown).

Moreover, the first and second transmission methods may be classified according to the transmission time. In this case, the receiver 610 firstly receives the first data. Then, when a request signal is received from the user, the second data is received.

The task performing unit 620 continuously performs a task in the external device using the first and second data.

Figure 7:
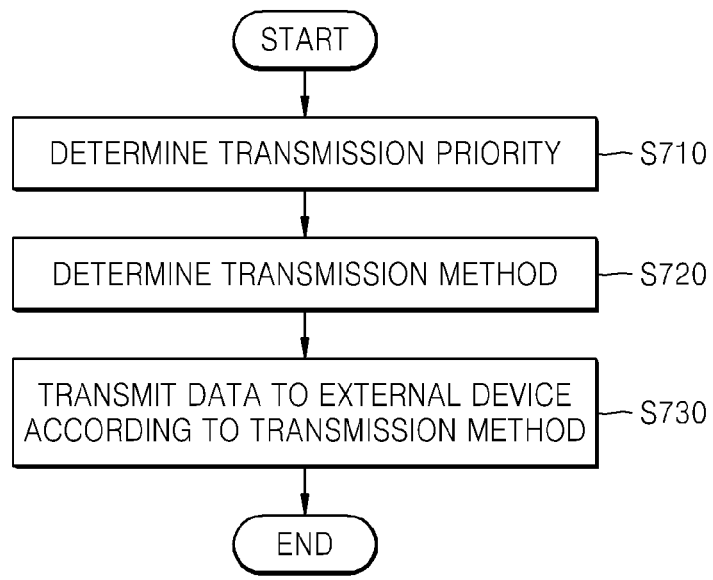
FIG. 7 is a flowchart of a method of transmitting data according to an embodiment of the present invention.

FIG. 7 is a flowchart of a method of transmitting data according to an embodiment of the present invention.

In operation 710, the data transmission priority is determined using at least one of information relating to data needed to continuously perform a task, that is currently performing, in an external device and information relating to data transmission means. The information relating to data needed to continuously perform a task that is currently performed in the external device may be data needed for process migration. For example, information relating to a task execution state, a communication state, an address allocation, and a task control may be data needed for process migration. Also, the information relating to the transmission means may be information relating to a transmission environment such as a size of a usable storage space and a data transmission speed.

Meanwhile, the standard for determining the data priority may be set regardless of an external input or may be set based on an external input.

In operation 720, the transmission methods are determined based on the data priority. When a user selects one transmission mode from among the transmission modes in which data transmission methods are set according to the data priority, the data transmission method is determined based on the selected transmission mode.

In operation 730, data is transmitted to the external device according to the determined transmission method.

Data having the data priority that is above a threshold order may be transmitted through a first transmission means, data having the data priority that is below a threshold order may be transmitted through a second transmission means, and only data having the data priority that is below a threshold order may be compressed and transmitted. Also, when a transmission request signal is received from the outside after the data having the data priority that is above a threshold order is transmitted, data having the data priority that is below a threshold order may be transmitted.

Figure 8:
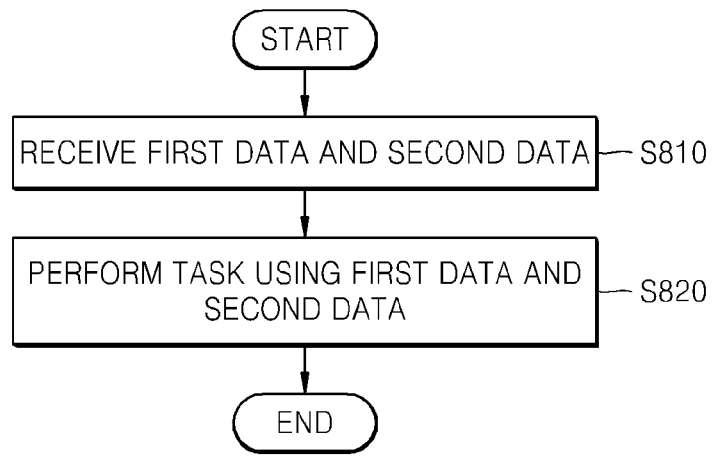
FIG. 8 is a flowchart of a method of performing a task according to an embodiment of the present invention.

FIG. 8 is a flowchart of a method of performing a task according to an embodiment of the present invention.

In operation 810, first data having the priority that is above a threshold order according to a predetermined standard from among data needed to continuously perform a task that is currently performed in the external device is received through a first transmission method. Also, second data having the data priority that is below a threshold order is received through a second transmission method. For example, the first data may be received through the mobile storage medium which can be removed from and attached to the external device and the second data may be received through a network. The received data may include at least one of information relating to a task execution state, a communication state, an address allocation, and a task control.

In operation 820, a task is continuously performed in the external device using the first and second data.

According to the present invention, the priority of data needed for process migration is determined and the transmission method differs according to the data priority, thereby efficiently transmitting data.

In addition, the transmission means differ according to the data priority so that process migration can be accomplished even if the capacity of the storage space is not sufficient.

Moreover, only essential data is firstly transmitted through the mobile storage medium and thus the data transmission time can be reduced.

Embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs or DVDs). Embodiments of the present invention can also be written as computer programs and can be implemented in general-use digital computers that execute the programs using a computer readable transmission medium. Examples of the computer readable transmission medium include media such as carrier waves (e.g., transmission through the Internet).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of transmitting data, comprising:

determining a data transmission priority for each of a plurality of data needed to continuously perform a task, that is currently performing, in an external device by using information relating to the plurality of data and information relating to a plurality of data transmission means, wherein the plurality of data transmission means includes a first transmission means comprising a mobile storage medium which can be removed from and attached to the external device and a second transmission means comprising a network;

determining a transmission method for each of the plurality of data based on the determined data transmission priority, wherein the transmission method comprises one of transmitting data through the mobile storage medium and transmitting data through the network, wherein the determining a transmission method comprises compressing data having the data transmission priority that is below a threshold order; and transmitting each of the plurality of data to the external device through one of the plurality of data transmission means corresponding to the determined transmission method of the each data of the plurality of data, wherein the transmitting data comprises transmitting uncompressed data having the data transmission priority that is above the threshold order and the compressed data, wherein the information relating to the plurality of data transmission means comprises at least one of a size of a usable storage space and a data transmission speed and the information relating to the plurality of data needed to continuously perform a task comprises information relating to at least one of a task execution state, a communication state, an address allocation, and a task control, wherein the size of the usable storage space indicates usable capacity of the mobile storage medium, and wherein the transmitting data comprises transmitting data having the data transmission priority that is above a threshold order through the first transmission means of the plurality of transmission means and data having the data transmission priority that is below the threshold order through the second transmission means of the plurality of transmission means.

2. The method of claim 1, wherein the transmitting data comprises:

transmitting data having data transmission priority that is above a threshold order; and transmitting data having data transmission priority that is below the threshold order when a transmission request signal is received.

3. The method of claim 1, further comprising setting a standard for determining the data transmission priority based on an external input, and wherein the determining of the data transmission priority further uses the set standard for determining the data transmission priority.

4. The method of claim 1, further comprising receiving input selecting one transmission mode from among transmission modes in which data transmission methods according to the data transmission priority are prescribed, and wherein the determining transmission method is performed based on the selected transmission mode.

5. A non-transitory computer readable recording medium having embodied thereon a computer program for executing the method of claim 1.

6. A method of performing a task, comprising:
receiving first data having data transmission priority that is above a threshold order according to a predetermined standard from among a plurality of data needed to continuously perform a task, that is currently performing, in an external device and receiving second data having data transmission priority that is below the threshold order, wherein the second data is compressed before being transmitted through a transmission method of the second data; and
continuously performing the task in the external device using the first and second data,
wherein the data transmission priority of each of the first data and the second data is determined by information relating to the plurality of data needed to continuously perform the task, that is currently performing, in the external device and information relating to a plurality of data transmission means,
wherein the receiving the first data and the second data comprises receiving the first data through a mobile storage medium which can be removed from and attached to the external device based on the determined data transmission priority of the first data and receiving the second data through a network based on the determined data transmission priority of the second data, the plurality of data transmission means including the mobile storage medium and the network,
wherein the information relating to the plurality of data transmission means comprises at least one of a size of a usable storage space and a data transmission speed and the information relating to the plurality of data needed to continuously perform the task comprises information relating to at least one of a task execution state, a communication state, an address allocation, and a task control, wherein the size of the usable storage space indicates usable capacity of the mobile storage medium.

7. The method of claim 6, wherein the information relating to the plurality of data comprises information relating to at least one of a task execution state, a communication state, an address allocation, and a task control.

8. An apparatus for transmitting data, comprising:
a priority determining unit which determines a data transmission priority for each of a plurality of data needed to continuously perform a task, that is currently performing, in an external device by using information relating to the plurality of data and information relating to a plurality of data transmission means, wherein the plurality of data transmission means includes a first transmission means comprising a mobile storage medium which can be removed from and attached to the external device and a second transmission means comprising a network;
a transmission method determining unit which determines a transmission method for each of the plurality of data based on the determined data transmission priority, wherein the transmission method comprises one of transmitting data through the mobile storage medium and transmitting data through the network, wherein the transmission method determining unit comprises a data compression unit which compresses data having the data transmission priority that is below a threshold order; and
a transmission unit which transmits each of the plurality of data to the external device through one of the plurality of data transmission means corresponding to the determined transmission method of the each data of the plurality of data, wherein the transmission unit transmits uncompressed data having the data transmission priority that is above the threshold order data and the compressed data,
wherein the information relating to the plurality of data transmission means comprises at least one of a size of a usable storage space and a data transmission speed and the information relating to the plurality of data needed to continuously perform a task comprises information relating to at least one of a task execution state, a communication state, and address allocation, and a task control, wherein the size of the usable storage space indicates usable capacity of the mobile storage medium, and
wherein the transmission unit transmits data having the data transmission priority that is above a threshold order through the first transmission means of the plurality of transmission means and data having the data transmission priority that is below the threshold order through the second transmission means of the plurality of transmission means.

9. The apparatus of claim 8, wherein the transmission unit transmits data having data transmission priority that is above a threshold order and transmits data having data transmission priority that is below the threshold order when a transmission request signal is received from outside.

10. The apparatus of claim 8, further comprising a standard setting unit which sets a standard for determining the data transmission priority based on an input from outside, and wherein the priority determining unit further uses the set standard for determining the data transmission priority.

11. The apparatus of claim 8, further comprising a transmission mode selecting unit receives input which selects one transmission mode from among transmission modes in which data transmission methods according to the data transmission priority are prescribed, and wherein the transmission method determining unit performs based on the selected transmission mode.

12. An apparatus for performing a task, comprising:
a receiver which receives first data having data transmission priority that is above a threshold order according to a predetermined standard from among a plurality of data needed to continuously perform a task, that is currently performing, in an external device and receives second data having data transmission priority that is below a threshold order, wherein the second data is compressed before being transmitted through a transmission method of the second data; and
a task performing unit which continuously performs the task in the external device using the first and second data,
wherein the data transmission priority of each of the first data and the second data is determined by information relating to data needed to continuously perform the task, that is currently performing, in the external device and information relating to a plurality of data transmission means,
wherein the receiving the first data and the second data comprises receiving the first data through a mobile storage medium which can be removed from and attached to the external device based on the determined data transmission priority of the first data and receiving the second data through a network based on the determined data transmission priority of the second data, the plurality of data transmission means including the mobile storage medium and the network, wherein the information relating to the plurality of data transmission means comprises at least one of a size of a usable storage space and a data transmission speed and the information relating to the plurality of data needed to continuously perform the task comprises information relating to at least one of a task execution state, a communication state, an address allocation, and a task control, wherein the size of the usable storage space indicates usable capacity of the mobile storage medium.

13. The apparatus of claim 12, wherein the information relating to the plurality of data comprises information relating to at least one of a task execution state, a communication state, an address allocation, and a task control.

* * * * *